A. M. DARRELL,
Assignor, by mesne assignments, to S. C. KEMON & L. HILL.
Branding Stamp.
No. 9,516. Reissued Dec. 28, 1880.
Fig. 1.
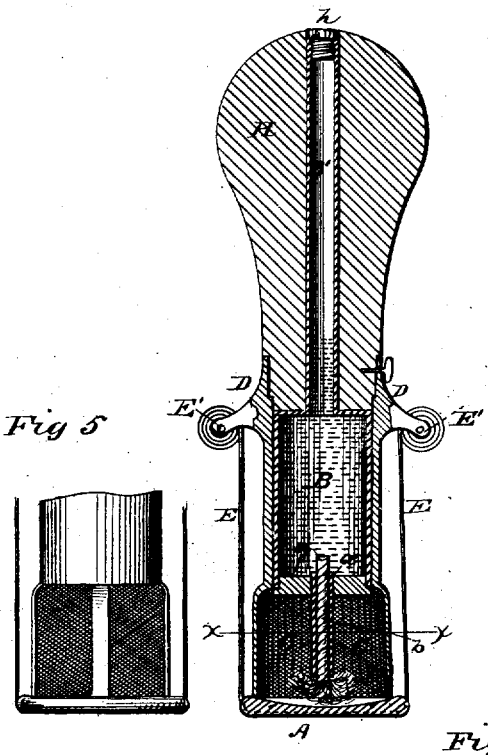
Fig. 2.
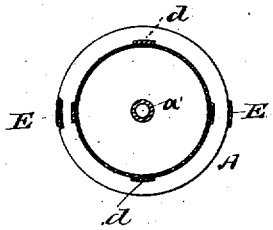
Fig. 3.
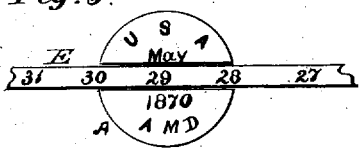
Fig 5
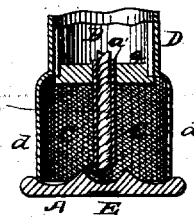
Fig 4
Fig. 6
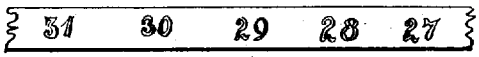
Attest,
W H H Knight,
F. F. Blunch.
Inventor,
Armistead M. Darrell
By Hill & Church
His Attys.
N. PETERS, PHOTO-LITHOGRAPHER, WASHINGTON, D. C.

UNITED STATES PATENT OFFICE.

ARMISTEAD M. DARRELL, OF WASHINGTON, DISTRICT OF COLUMBIA, ASSIGNOR, BY MESNE ASSIGNMENTS, TO SOLON C. KEMON AND LYSANDER HILL, OF SAME PLACE.

BRANDING-STAMP.

SPECIFICATION forming part of Reissued Letters Patent No. 9,516, dated December 28, 1880.

Original No. 111,436, dated January 31, 1871. Application for reissue filed August 2, 1880.

*To all whom it may concern:*

Be it known that I, ARMISTEAD M. DARRELL, of the city and county of Washington, and District of Columbia, have invented a new and Improved Device for Canceling Stamps; and I do hereby declare the following to be a full, clear, and exact description thereof, reference being had to the accompanying drawings, forming part of this specification, in which—

Figure 1 is a longitudinal section. Fig. 2 is a cross-section through line *x x* of Fig. 1. Fig. 3 is a face view of the die-plate and movable strip. Fig. 4 is a section showing a modified construction of die-plate. Fig. 5 is a side elevation of the lower portion of Fig. 1; and Fig. 6 is an enlarged view of the movable strip.

Similar letters of reference indicate like parts in the several figures.

This invention relates to that class of stamps which indelibly mark an object by burning an impression into it with a heated die; and the object of the invention is so to improve the stamp that it shall be self-heating, and at the same time be neat, durable, cheap, and convenient, the heating apparatus being as capable of adaptation to small hand-stamps as to the larger classes of spring-stamps, &c.

To this end the invention consists, primarily, in a stamp provided with a handle, an oil or gas burner, a branding-surface to be heated by the flame of the burner, and a passage through the handle for conveying the oil or gas to the burner.

It further consists in the several novel combinations and subcombinations of parts, and in certain details of construction, which I will now proceed to describe.

In the drawings, H is a handle, of wood or other material, secured to a casting, D, which may be of any suitable metal, and its lower end furnished with four or more uprights, *d*, within which is placed a wire screen, C.

Centrally located within the casting D is a metal case, B, having an upper tube, B′, which is closed at top by screw-tap *h*, case B being closed at bottom by screw-tap *a*, to which is secured the wick-tube *a′*, furnished with a closely-fitting wick, *b*.

Secured to the lower end of the uprights *d* is the die-plate A, which should be of such material as will hold heat best. On said die-plate A are cast or otherwise raised, on its lower face, such letters or characters as may suit to be branded on the stamp or paper.

On either side of casing D, and near the upper end thereof, are two lugs to form the axes of the two small rollers E′, on which is reeled a metallic strip, E E, (very thin,) and having the dates or other characters stamped out, so that when they are under the heat of the lamp, which is above plate A, the metal strip thereunder will be heated, together with the plate A and band alike, all save where the date is stamped out, thus leaving it legible. The rollers upon which the metallic date-strip is reeled should be so arranged as, by one turn of a thumb screw or wheel, to feed out just enough of said metal strip as will bring each date alternately under the center of the die-plate and the slack taken up on the other roller. The metallic date-strip traverses under the die-plate A within a groove or channel countersunk in the lower face of said die-plate, so as to bring the metal date-strip flush with the lower face of the die-plate A.

The reservoir B, incased within the hollow of casting D, is filled with alcohol from the top of handle H through tube B′ by removing screw-tap *h*.

The modification shown in Fig. 4 is designed to facilitate the heating of the plate when the stamp is lying in a horizontal position, the die-plate being cast with a recess in its reverse side, into which projects the wick, so that in whatever position the stamp may lie the flame, besides being itself protected from currents of air, will constantly impinge against the metallic plate and keep it uniformly heated. The air feeds around the end of the wick-tube to the flame.

If preferred, the handle H could be so shaped and weighted as to assume a vertical, or nearly vertical, position when laid down, and thereby keep the flame in constant contact with the die-plate.

I do not, of course, confine myself to the precise form of reservoir B shown in the drawings. If preferred, any other convenient form may be substituted, and it may occupy the whole interior of handle H, the latter, in such case, being made of metal or other suitable material.

It is obvious that if the above-described hand-stamp be suspended in a suitable frame having a spring to throw the stamp up as soon as the hand that depresses it is removed we shall have a convenient spring-stamp. I contemplate its use in that way, and for that purpose I may attach the device—that is to say, the material parts of it—in the manner substantially as described, to any form of apparatus employed in connection with spring-stamps.

Instead of filling the reservoir with spirits, gas may be employed, the end of a flexible drop-tube being attached in place of the screw-tap *h*, and a gas-burner being employed instead of the wick.

I am aware that a blunt-pointed tool adapted in size and form for marking or grooving various designs on leather and other similar substances has been employed in connection with a handle arranged at right angles to the axis or shaft of the tool and parallel to the marking end thereof, and also, in connection with a gas-burner, for heating the point of the tool, and a flexible pipe for conveying the gas to the burner.

I am also aware that a stationary flame has been employed, in connection with a stamp arranged to pass through or from the flame, imprint the mark, and return to the flame.

I am also aware that a flat roughened branding-surface has been combined with a receptacle for incandescent coal or other solid fuel, arranged behind and above the branding-surface and moving therewith, said instrument being, in substance, a small coal-stove, the heated bottom of which is used as a branding-surface.

I do not claim the said devices nor any of them, my invention being limited, in the first place, to a stamp-canceling instrument; in the second place, to an instrument in which the heat is derived from a fluid, gas, or vapor burner continuously fed with liquid or gaseous fuel as fast as is needed for combustion by means of a suitable conductor leading from the source of supply to the burner; and, in the third place, to an instrument in which the heating-flame so fed moves with the canceling plate or surface, and always preserves the same distance and position relative thereto.

What I claim is—

1. In a branding stamp-canceling instrument adapted to brand figures or letters, &c., upon a plane surface by a single impression, the combination of a branding-surface or die-face the plane of which is substantially at right angles to the axis of the handle, so that pressure endwise upon the handle will force the heated surface against the stamp which is to be canceled or surface which is to be marked, a fluid or oil burner arranged behind and above the canceling-surface for the purpose of heating the same by the direct contact of the flame, and a passage or communication from the burner through the handle or part which supports the die-plate for the purpose of continuously and automatically supplying fresh fuel as fast as it burns away or is needed to support combustion, all said parts being connected so as to move together in the process of canceling or stamping, substantially as described.

2. In a canceling or branding stamp adapted to brand figures or letters, &c., upon a plane surface by a single impression, a substantially flat die-surface adapted to mark letters or figures upon the stamp which is to be canceled or surface which is to be branded, in combination with a fluid or gas burner arranged behind the die-surface for the purpose of heating the same from the rear side, and with a handle and means for continuously and automatically supplying fresh fuel to the burner, said parts being all connected and moving together, substantially as described.

3. In a hand-stamp adapted to brand figures or letters, &c., upon a plane surface by a single impression, a combustion-chamber moved by a handle and to which fresh fuel is continuously and automatically supplied as fast as needed, a branding-die attached to and forming the lower side of the combustion-chamber and heated by the direct contact of the flame in the chamber, a passage or tube through which the fresh fuel is continuously supplied from a source outside of the combustion-chamber, and apertures through which air is supplied to said chamber to support combustion, substantially as described.

ARMISTEAD M. DARRELL.

Witnesses:
M. CHURCH,
JOSEPH FORREST.